United States Patent
Caruso et al.

(10) Patent No.: US 10,753,680 B2
(45) Date of Patent: Aug. 25, 2020

(54) METHOD AND SYSTEM FOR SEPARATING CARBON DIOXIDE FROM FLUE GAS

(71) Applicant: General Electric Technology GmbH, Baden (CH)

(72) Inventors: Andrea Caruso, Mainz Kastel (DE); Olaf Stallmann, Wiesbaden (DE); Markus Jorg Weitzel, Mainz Kastel (DE); Christian Karl Britz, Mainz Kastel (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 99 days.

(21) Appl. No.: 15/933,675

(22) Filed: Mar. 23, 2018

(65) Prior Publication Data

US 2018/0209726 A1     Jul. 26, 2018

Related U.S. Application Data

(63) Continuation of application No. PCT/EP2016/072242, filed on Sep. 20, 2016.

(30) Foreign Application Priority Data

Sep. 24, 2015   (EP) .................................... 15186694

(51) Int. Cl.
*F25J 3/02*   (2006.01)
*B01D 53/62*  (2006.01)
*B01D 53/75*  (2006.01)

(52) U.S. Cl.
CPC ............ *F25J 3/0266* (2013.01); *B01D 53/62* (2013.01); *B01D 53/75* (2013.01); *F25J 3/0219* (2013.01); *F25J 3/0295* (2013.01); *B01D 2256/22* (2013.01); *B01D 2258/0291* (2013.01); *F25J 2200/02* (2013.01); *F25J 2200/40* (2013.01); *F25J 2200/70* (2013.01); *F25J 2205/04* (2013.01); *F25J 2210/70* (2013.01); *F25J 2215/04* (2013.01); *F25J 2215/80* (2013.01); *F25J 2220/82* (2013.01);
(Continued)

(58) Field of Classification Search
CPC .......... F25J 3/067; F25J 3/0266; F25J 3/0223; F25J 2210/70; F25J 2210/80; F25J 2215/80

See application file for complete search history.

(56) References Cited

U.S. PATENT DOCUMENTS

| | | | |
|---|---|---|---|
| 2008/0173584 A1* | 7/2008 | White | F25J 3/0223 210/656 |
| 2013/0205827 A1* | 8/2013 | Stallmann | B01D 53/002 62/606 |
| 2014/0033764 A1* | 2/2014 | Higginbotham | B01D 53/002 62/639 |

FOREIGN PATENT DOCUMENTS

| | | |
|---|---|---|
| EP | 2 381 198 A1 | 10/2011 |
| WO | 2012/038637 A1 | 3/2012 |

(Continued)

OTHER PUBLICATIONS

Extended European Search Report and Opinion issued in connection with corresponding EP Application No. 15186694.4 dated Mar. 29, 2016.

(Continued)

*Primary Examiner* — Brian M King
(74) *Attorney, Agent, or Firm* — Grogan, Tuccillo & Vanderleeden, LLP

(57) ABSTRACT

A method for separating carbon dioxide from flue gas to generate a high purity CO2 stream.

16 Claims, 1 Drawing Sheet

(52) U.S. Cl.
CPC ........ *F25J 2230/04* (2013.01); *F25J 2230/20* (2013.01); *F25J 2230/30* (2013.01); *F25J 2230/32* (2013.01); *F25J 2240/40* (2013.01); *F25J 2270/02* (2013.01); *F25J 2270/80* (2013.01); *Y02C 10/04* (2013.01); *Y02C 10/12* (2013.01)

(56) References Cited

FOREIGN PATENT DOCUMENTS

| | | |
|---|---|---|
| WO | 2013/135993 A2 | 9/2013 |
| WO | 2013/171426 A2 | 11/2013 |

OTHER PUBLICATIONS

International Search Report and Written Opinion issued in connection with corresponding PCT Application No. PCT/EP2016/072242 dated Dec. 22, 2016.
International Preliminary Report on Patentability issued in connection with corresponding PCT Application No. PCT/EP2016/072242 dated Mar. 27, 2018.

\* cited by examiner

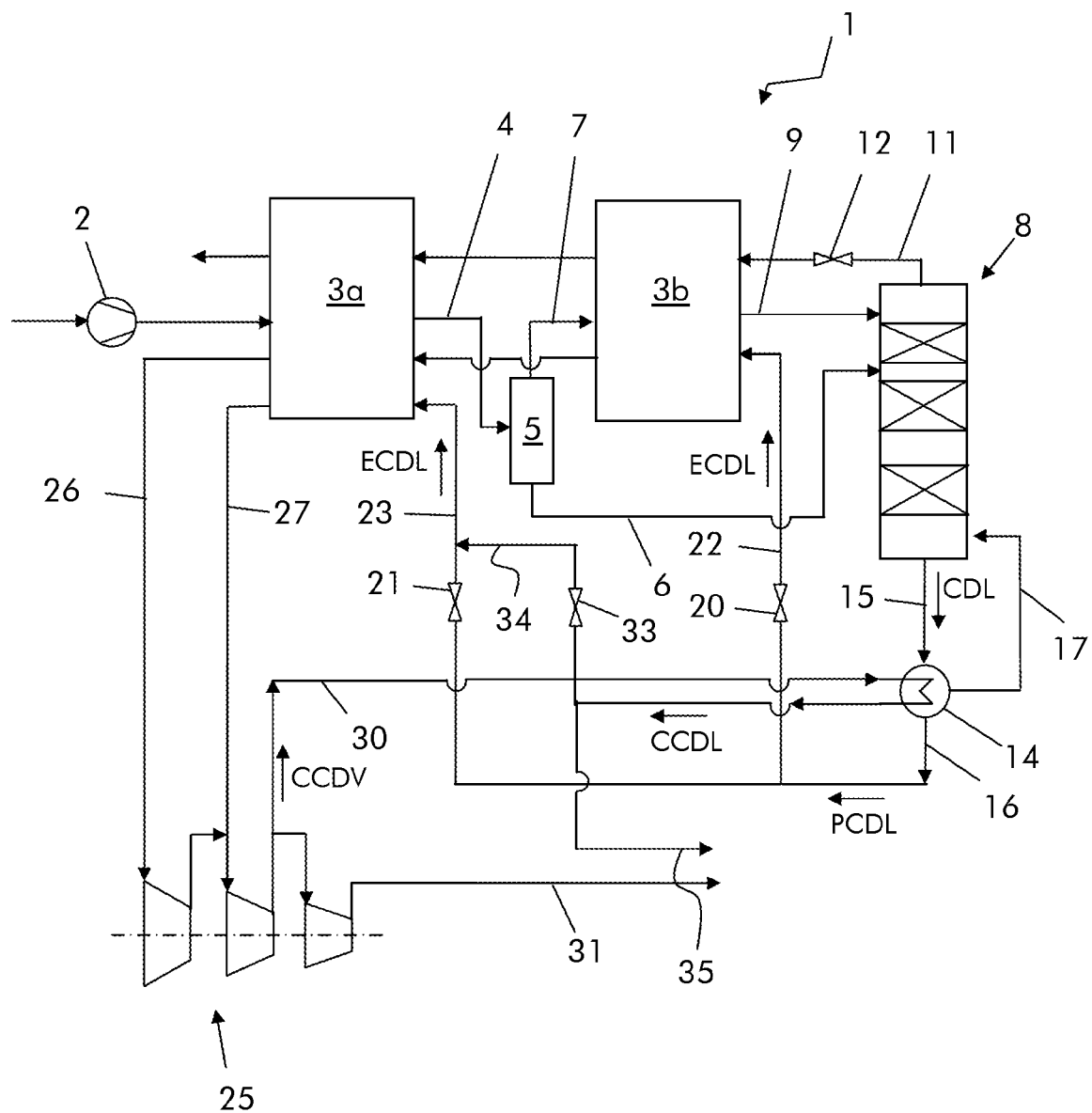

METHOD AND SYSTEM FOR SEPARATING CARBON DIOXIDE FROM FLUE GAS

CROSS-REFERENCE TO RELATED APPLICATIONS

This application claims priority to PCT/EP2016/072242, filed Sep. 20, 2016, which in turn claims priority to EP Application 15186694.4, filed Sep. 24, 2015, each of which are incorporated herein, in their entireties.

TECHNICAL FIELD

Embodiments of the subject matter disclosed herein relate to methods and systems for separating carbon dioxide from flue gas. For example, the method and system can be used for separating and then sequestering carbon dioxide from flue gas generated during combustion of a fossil fuel such as coal or oil in a power plant for electric power generation.

BACKGROUND

EP 2 381 198 discloses a method for separating carbon dioxide from a flue gas.

According to EP 2 381 198, flue gas is first compressed and pretreated e.g., to cool it and remove water. The flue gas is then passed through a sequence of heat exchangers (the so called cold boxes) where the flue gas is separated into carbon dioxide rich streams and carbon dioxide lean streams, which are then supplied into a distillation column.

At the distillation column non-condensable gas (e.g. nitrogen, argon, etc.) and carbon dioxide liquid are separated.

The non-condensable gas, after expansion in an expansion valve, is passed through the heat exchangers (cold boxes) to cool them.

The carbon dioxide liquid is further purified in a reboiler, where non-condensable gas is further separated and removed from the carbon dioxide liquid. In this respect the carbon dioxide liquid from the distillation column is passed through a cold side of the reboiler, and already purified carbon dioxide from a high-pressure compressor is passed through a warm side of the reboiler.

The carbon dioxide liquid, from both the warm side of the reboiler and the cold side of the reboiler, is then collected in a buffer drum.

From the buffer drum, the carbon dioxide liquid is expanded and passed through the heat exchangers (cold boxes) to cool them.

At the buffer drum, carbon dioxide evaporation occurs due to the heat exchange through the surface of the buffer drum. In addition, because of the different temperatures of the carbon dioxide liquid from the cold side of the reboiler (e.g. about 0° C.) and warm side of the reboiler (e.g. about 3° C.); these different temperatures cause heating of the colder carbon dioxide liquid against the warmer carbon dioxide liquid thus leading to the risk of evaporation.

Thus, a system and method that counteract risk of carbon dioxide liquid evaporation, after the carbon dioxide liquid has been separated from other non-condensable gas is needed.

BRIEF DESCRIPTION

In one embodiment, a system and method for separating carbon dioxide from flue gases includes a compressor and compressing the flue gas and then cooling the compressed flue gas in at least a heat exchanger, separating a carbon dioxide rich liquid from a carbon dioxide lean gas, supplying the carbon dioxide rich liquid and the carbon dioxide lean gas into a distillation column, separating in the distillation column non-condensable gas from carbon dioxide liquid, heating the carbon dioxide liquid (CDL) at a cold side of a reboiler generating a purified carbon dioxide liquid (PCDL), expanding the purified carbon dioxide liquid (PCDL) and supplying the expanded carbon dioxide liquid (ECDL) to the heat exchangers for cooling, supplying the expanded carbon dioxide liquid (ECDL) from the heat exchangers to a high-pressure compressor to generate a compressed carbon dioxide vapor (CCDV), supplying a part of the compressed carbon dioxide vapor (CCDV) from the high-pressure compressor to a warm side of the reboiler generating a cooled carbon dioxide liquid (CCDL), expanding the cooled carbon dioxide liquid (CCDL) and passing the cooled carbon dioxide liquid (CCDL) through the heat exchangers for cooling. The purified carbon dioxide liquid (PCDL) and the cooled carbon dioxide liquid (CCDL) are directly forwarded to the at least a heat exchanger.

BRIEF DESCRIPTION OF THE DRAWINGS

The subject matter described herein will be better understood from reading the following description of non-limiting embodiments, with reference to the attached drawing, wherein below:

FIG. 1 illustrates an embodiment of a system and method for separating carbon dioxide from flue gas.

DETAILED DESCRIPTION

One or more embodiments of the inventive subject matter described herein provide a system and method for separating carbon dioxide from flue gas includes a compressor 2 usually followed by pre-treatment units, such as a dryer and/or a cooler and/or others (not shown). Downstream of the compressor 2, one or more heat exchangers are provided (in the attached Figure two heat exchangers 3a and 3b are shown connected in series). The heat exchangers 3a, 3b are arranged for cooling the flue gas (FG) and separating a carbon dioxide rich liquid from a carbon dioxide lean gas.

In one embodiment, the flue gas cooled in the first heat exchanger 3a generates a stream 4 which is supplied to a separator 5 to generate a carbon dioxide rich liquid 6 stream and a carbon dioxide lean gas 7 stream.

The carbon dioxide rich liquid stream 6 is supplied into a distillation column 8, while the carbon dioxide lean gas 7 is further supplied into the second heat exchanger 3b.

From the second heat exchanger 3b, a stream 9 is extracted and supplied into the distillation column 8.

From the top of the distillation column 8 non-condensable gas originally contained in the flue gas is extracted via piping 11 and expanded in an expansion valve 12 for cooling. Thus, the expanded non-condensable gas is passed through the heat exchanger 3b and 3a for cooling them.

Carbon dioxide liquid is collected at the bottom of the distillation column 8 and is forwarded to the reboiler 14, the reboiler having a cold side and a warm side. In particular, the carbon dioxide liquid is heated at the cold side of the reboiler 14 thus generating a purified carbon dioxide liquid (PCDL) stream.

In this respect, a line 15 connects the distillation column 8 to the cold side of the reboiler 14. Piping 16 moves the purified carbon dioxide liquid away from the cold side of the reboiler 14 and a line 17 brings a mixture of residual non-condensable gas and carbon dioxide from the cold side of the reboiler 14 back into the distillation column 8.

The system further has one or more first expansion valves for expanding the purified carbon dioxide liquid and branches for supplying the expanded carbon dioxide ECDL liquid to the one or more heat exchangers 3a, 3b for cooling them.

In the embodiment of FIG. 1, the system is provided with two first expansion valves 20, 21 for expanding the purified carbon dioxide liquid PCDL and branches 22, 23 for supplying the expanded carbon dioxide liquid ECDL to the two heat exchangers 3a, 3b. The branches 22, 23 are connected to the piping 16.

Further piping to bring the non-condensable gas and the expanded carbon dioxide liquid from one heat exchanger (e.g. 3b) to another (e.g. 3a) in order to cool more than one heat exchanger with the same non-condensable gas and carbon dioxide liquid are preferably also provided.

In addition, a high-pressure compressor 25 (e.g. of the multistage type, possibly with intercooling) and piping are provided; the piping is for supplying the expanded carbon dioxide liquid ECDL from the one or more heat exchangers 3a, 3b to the high-pressure compressor 25, where expanded carbon dioxide liquid is compressed generating a compressed carbon dioxide vapor CCDV.

In the embodiment of FIG. 1, piping 26, 27 are provided to forward the expanded carbon dioxide liquid from the heat exchanger 3a, 3b to the high-pressure compressor 25.

In addition, piping 30 is also provided for supplying a first part of the compressed carbon dioxide vapor CCDV from the high-pressure compressor 25 to the warm side of the reboiler 14, generating a cooled carbon dioxide liquid CCDL.

Another part of the compressed carbon dioxide vapor (possibly further compressed) from the high-pressure compressor 25 is forwarded via piping 31 to storing or pumping or other utilization.

The cooled carbon dioxide liquid CCDL discharged from the warm side of the reboiler 14 is expanded in a second expansion valve 33 and forwarded via piping 34 to one or both the heat exchangers 3a, 3b, such as e.g. only the heat exchanger 3a, for cooling.

In a preferred embodiment, the second expansion valve 33 is arranged for expanding the cooled carbon dioxide liquid CCDL to a pressure generating (because of the expansion) a temperature being the same as the temperature of one of the expanded carbon dioxide liquid (i.e. the temperature of the carbon dioxide liquid expanded in the first expansion valves 20, 21).

In the embodiment of FIG. 1, the second expansion valve 33 expands the cooled carbon dioxide liquid CCDL to the pressure generating a temperature being the same as the temperature of the expanded carbon dioxide liquid ECDL expanded in the expansion valve 21 and flowing through the branch 23.

This way, the flow through the piping 34 can be mixed to the flow through the branch 23 and they can be together supplied to the first heat exchanger 3a.

A part of the cooled carbon dioxide liquid CCDL can be diverted from the piping 34 (upstream of downstream of the second expansion valve 33) and sent to storing or pumping or other utilization via piping 35.

Flue gas (FG) is compressed in the compressor 2 and is then cooled and separated into a carbon dioxide rich liquid stream and carbon dioxide lean gas in the heat exchangers 3a, 3b.

The carbon dioxide rich liquid and carbon dioxide lean gas are both supplied into the distillation column 8. In the distillation column 8, non-condensable gas is extracted, expanded in the expansion valve 12 and used to cool the heat exchangers 3a and 3b.

The carbon dioxide liquid is directed into the reboiler 14 via the line 15; from the reboiler 14 (cold side thereof) purified carbon dioxide liquid PCDL is directly supplied (i.e. without passing through a buffer drum) to the heat exchangers 3a, 3b via the first expansion valves 20, 21 as expanded carbon dioxide liquid ECDL, to cool the heat exchangers 3a, 3b.

From the heat exchangers 3a, 3b the expanded carbon dioxide liquid is forwarded to the high-pressure compressor 25 generating compressed carbon dioxide vapor CCDV.

A part of this compressed carbon dioxide vapor CCDV is then fed to the warm side of the reboiler 14 and the resulting cooled carbon dioxide liquid CCDL is expanded in the second expansion valve 33 and mixed with the expanded carbon dioxide liquid ECDL directed to the heat exchanger 3a via the branch 23.

After expansion in the first and second expansion valves 20, 21 and 33 (and before mixing), the expanded carbon dioxide liquid ECDL (through the branch 23) and cooled carbon dioxide liquid CCDL (through piping 34) have the same temperature or substantially the same temperature.

Since the purified carbon dioxide liquid PCDL from the cold side of the reboiler 14 and the cooled carbon dioxide liquid CCDL from the warm side of the reboiler 14 are not supplied into a buffer tank and mixed there, evaporation of the carbon dioxide liquid is counteracted.

In fact the large heat exchanging surfaces of the buffer drum are avoided and in addition mixing of two liquids at different temperature does not occur.

In one example, the purified carbon dioxide liquid PCDL from the cold side of the reboiler 14 and the cooled carbon dioxide liquid CCDL from the warm side of the reboiler can be expanded to get substantially the same temperature.

In addition, the purified carbon dioxide liquid PCDL from the cold side of the reboiler 14 and the cooled carbon dioxide liquid CCDL from the warm side of the reboiler can also be expanded to get different temperature and they can then be separately supplied to the heat exchangers 3a, 3b to cool them. Naturally the purified carbon dioxide liquid PCDL from the cold side of the reboiler 14 and the cooled carbon dioxide liquid CCDL from the warm side of the reboiler can be expanded to get the same or substantially the same temperature and can then be separately supplied to the heat exchangers 3a, 3b to cool them.

In one embodiment, the method includes compressing the flue gas, cooling the compressed flue gas in at least a heat exchanger 3a, 3b separating a carbon dioxide rich liquid from a carbon dioxide lean gas, supplying the carbon dioxide rich liquid and the carbon dioxide lean gas into a distillation column 8, separating in the distillation column 8 non-condensable gas from carbon dioxide liquid, expanding the non-condensable gas and passing the expanded non-condensable gas through the at least a heat exchanger 3a, 3b for cooling, heating the carbon dioxide liquid at a cold side of a reboiler 14 generating purified carbon dioxide liquid PCDL, expanding the purified carbon dioxide liquid PCDL and supplying the expanded carbon dioxide liquid ECDL to the at least a heat exchanger 3a, 3b for cooling, supplying the expanded carbon dioxide liquid ECDL from the at least a heat exchanger 3a, 3b to a high-pressure compressor 25 to generate a compressed carbon dioxide vapor CCDV, supplying at least a part of the compressed carbon dioxide vapor CCDV from the high-pressure compressor 25 to the warm side of the reboiler 14 generating a cooled carbon dioxide liquid CCDL, expanding the cooled carbon dioxide liquid CCDL and passing the expanded cooled carbon dioxide liquid CCDL through the at least a heat exchanger 3a, 3b for cooling, directly forwarding the purified carbon dioxide liquid PCDL to the at least a heat exchanger 3a, 3b and the cooled carbon dioxide liquid CCDL to the at least a heat exchanger 3a, 3b.

The purified carbon dioxide liquid PCDL and the cooled carbon dioxide liquid CCDL can be forwarded to the heat exchangers 3a, 3b mixed or not.

In the case where they are mixed, they are previously expanded such that they have the same temperature or substantially the same temperature.

In the case where they are not mixed, they can be expanded to substantially the same temperature or to different temperatures and can be used to cool the same heat exchangers 3a, 3b or different heat exchangers 3a, 3b. Buffer drums (e.g., as needed in the prior art) are thus avoided.

In one embodiment, the method is implemented in two heat exchangers 3a, 3b connected in series and the purified carbon dioxide liquid PCDL is split in two streams; each of the streams is expanded to a given pressure generating two expanded carbon dioxide liquids having different temperatures; each expanded carbon dioxide liquid ECDL is thus supplied to one of the heat exchangers 3a, 3b.

In one example, the cooled carbon dioxide liquid CCDL is expanded to a pressure generating a temperature being the same or substantially the same as the temperature of one of the expanded carbon dioxide liquid ECDL, e.g., the cooled carbon dioxide liquid CCDL is expanded to a pressure generating a temperature being the same or substantially the same as the temperature of the expanded carbon dioxide liquid ECDL through the branch 23.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and, also, to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What we claim is:

1. A method for separating carbon dioxide from flue gas, the method comprising:
   compressing the flue gas,
   cooling the compressed flue gas in at least a heat exchanger;
   providing the cooled compressed gas to a separator to generate a carbon dioxide rich liquid stream and a carbon dioxide lean gas stream;
   providing the carbon dioxide rich liquid stream and the carbon dioxide lean gas stream to a distillation column to generate a non-condensable gas stream and a carbon dioxide liquid;
   providing the carbon dioxide liquid at a cold side of a reboiler to generate a purified carbon dioxide liquid;
   expanding the purified carbon dioxide liquid and supplying the expanded carbon dioxide liquid to the at least a heat exchanger for cooling the at least a heat exchanger;
   providing the expanded carbon dioxide liquid from the at least a heat exchanger to a high-pressure compressor to generate a compressed carbon dioxide vapor;
   providing at least a part of the compressed carbon dioxide vapor from the high-pressure compressor to a warm side of the reboiler to generate a cooled carbon dioxide liquid; and
   expanding the cooled carbon dioxide liquid and passing the cooled carbon dioxide liquid through the at least a heat exchanger for cooling the at least a heat exchanger;
   wherein the purified carbon dioxide liquid and the cooled carbon dioxide liquid are forwarded to the at least a heat exchanger without first being supplied to, or mixed in, a buffer drum.

2. The method according to claim 1, further comprising:
   cooling the flue gas in at least two heat exchangers connected in series,
   splitting the purified carbon dioxide liquid in at least two streams,
   expanding each of the streams to a given pressure to generate at least two expanded carbon dioxide liquids streams having different temperatures,
   supplying each expanded carbon dioxide liquid stream to one of the at least two heat exchangers.

3. The method according to claim 1,
   wherein the cooled carbon dioxide liquid is expanded to a pressure corresponding to a temperature of the expanded carbon dioxide liquid.

4. The method according to claim 1, further comprising:
   expanding the non-condensable gas and passing the expanded non-condensable gas through the at least a heat exchanger for cooling the at least a heat exchanger.

5. A system for separating carbon dioxide from flue gas, the system comprising:
   a compressor;
   at least a heat exchanger downstream of the compressor, configured to cool the flue gas and generate a carbon dioxide rich liquid stream and a carbon dioxide lean gas stream;
   a distillation column downstream of the at least a heat exchanger configured to generate a non-condensable gas stream and a carbon dioxide liquid stream;

a reboiler with a cold side and a warm side, configured to heat the carbon dioxide liquid stream at the cold side to generate a purified carbon dioxide liquid stream;

at least a first expansion valve for expanding the purified carbon dioxide liquid stream;

piping for supplying the expanded carbon dioxide liquid to the at least a heat exchanger for cooling the at least a heat exchanger;

a high-pressure compressor;

piping for supplying the expanded carbon dioxide liquid from the at least a heat exchanger to the high-pressure compressor to generate a compressed carbon dioxide vapor stream;

piping for supplying at least a part of the compressed carbon dioxide vapor stream from the high-pressure compressor to the warm side of the reboiler, the warm side of the reboiler generating a cooled carbon dioxide liquid stream;

at least a second expansion valve downstream of the cold side of the reboiler, for expanding the cooled carbon dioxide liquid stream, first and second piping disposed respectively between the warm side of the reboiler and the at least a heat exchanger and the cold side of the reboiler and the at least a heat exchanger, the first piping for providing the cooled carbon dioxide liquid to the at least a heat exchanger, and the second piping for providing the purified carbon dioxide liquid to the at least a heat exchanger; and piping for diverting at least a portion of the cooled carbon dioxide liquid from the first piping directly to storage.

6. The system according to claim 5, wherein:
the at least a heat exchanger comprises at least two heat exchangers connected in series;
the first piping is connected to the branches for splitting the purified carbon dioxide liquid in at least two streams;
the at least a first expansion valve comprises a first expansion valve on each of the branches for expanding each of the streams to a given pressure to generate at least two expanded carbon dioxide liquid streams having different temperatures; and
wherein each branch is connected to one of the heat exchangers for supplying expanded carbon dioxide liquid to one of the at least two heat exchangers.

7. The system according to claim 5, wherein:
the second expansion valve is configured to expand the cooled carbon dioxide liquid to a pressure corresponding to temperature of the expanded carbon dioxide liquid stream.

8. The system according to claim 5, further comprising:
at least an expansion valve for expanding the non-condensable gas; and
piping for supplying the expanded non-condensable gas to the at least a heat exchanger for cooling the at least a heat exchanger.

9. The system according to claim 5, wherein the first piping and the second piping are configured to forward the purified carbon dioxide liquid and the cooled carbon dioxide liquid to the at least a heat exchanger without first being supplied to, or mixed in, a buffer drum.

10. The method according to claim 1, further comprising the step of:
providing the cooled carbon dioxide liquid to only a portion of the purified carbon dioxide liquid exiting the reboiler.

11. The method according to claim 2, further comprising the step of:
providing the cooled carbon dioxide liquid to only one of the at least two streams.

12. The method according to claim 1, further comprising the step of:
diverting a portion of the cooled carbon dioxide liquid directly to storage after exiting the reboiler.

13. The system of claim 5, wherein:
the cooled carbon dioxide liquid is provided to less than all of the purified carbon dioxide liquid exiting the reboiler.

14. The system of claim 13, further comprising:
a line for bringing a mixture of residual, non-condensable gas and carbon dioxide from the cold side of the reboiler back into the distillation column.

15. A method for separating carbon dioxide from flue gas, the method comprising:
compressing the flue gas,
cooling the compressed flue gas in at least a heat exchanger;
providing the cooled compressed gas to a separator to generate a carbon dioxide rich liquid stream and a carbon dioxide lean gas stream;
providing the carbon dioxide rich liquid stream and the carbon dioxide lean gas stream to a distillation column to generate a non-condensable gas stream and a carbon dioxide liquid;
providing the carbon dioxide liquid at a cold side of a reboiler to generate a purified carbon dioxide liquid;
expanding the purified carbon dioxide liquid and supplying the expanded carbon dioxide liquid to the at least a heat exchanger for cooling the at least a heat exchanger;
providing the expanded carbon dioxide liquid from the at least a heat exchanger to a high-pressure compressor to generate a compressed carbon dioxide vapor;
providing at least a part of the compressed carbon dioxide vapor from the high-pressure compressor to a warm side of the reboiler to generate a cooled carbon dioxide liquid;
expanding the cooled carbon dioxide liquid and passing the cooled carbon dioxide liquid through the at least a heat exchanger for cooling the at least a heat exchanger;
providing the cooled carbon dioxide liquid to only a portion of the purified carbon dioxide liquid exiting the reboiler; and
diverting a portion of the cooled carbon dioxide liquid directly to storage after exiting the reboiler.

16. The method according to claim 14, wherein:
the purified carbon dioxide liquid and the cooled carbon dioxide liquid are forwarded to the at least a heat exchanger without first being supplied to, or mixed in, a buffer drum.

* * * * *